US006926444B2

(12) United States Patent
Rengmyr

(10) Patent No.: US 6,926,444 B2
(45) Date of Patent: Aug. 9, 2005

(54) MAIN BEARING CAP FOR INTERNAL COMBUSTION ENGINES

(75) Inventor: Staffan Rengmyr, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 10/248,080

(22) Filed: Dec. 17, 2002

(65) Prior Publication Data

US 2003/0118261 A1 Jun. 26, 2003

(30) Foreign Application Priority Data

Dec. 21, 2001 (EP) ............................................ 01850219

(51) Int. Cl.[7] ............................ F16C 35/02; F16C 9/00; F02F 7/00

(52) U.S. Cl. .................. 384/433; 122/195 R; 384/429; 29/898.12

(58) Field of Search ................................ 384/434, 428, 384/429, 432, 433; 29/898.12, 888.08, 527.5; 164/98; 123/195 R

(56) References Cited

U.S. PATENT DOCUMENTS

| | | | | | |
|---|---|---|---|---|---|
| 2,997,347 | A | * | 8/1961 | Bauer | 384/432 |
| 4,643,145 | A | * | 2/1987 | Bolton et al. | 123/195 R |
| 4,693,216 | A | * | 9/1987 | Ampferer et al. | 123/195 R |
| 5,203,854 | A | | 4/1993 | Nilsson et al. | |
| 5,501,529 | A | * | 3/1996 | Cadle et al. | 384/432 |
| 5,609,422 | A | * | 3/1997 | Mueller et al. | 384/278 |
| 6,076,971 | A | * | 6/2000 | Warwick et al. | 384/433 |
| 6,357,412 | B1 | * | 3/2002 | Menzl | 123/195 H |
| 6,422,755 | B1 | * | 7/2002 | Cadle et al. | 384/433 |
| 6,543,334 | B2 | * | 4/2003 | Yamauchi | 92/140 |
| 6,655,843 | B2 | * | 12/2003 | Suzuki | 384/433 |

FOREIGN PATENT DOCUMENTS

| | | |
|---|---|---|
| DE | 19732838 | 2/1999 |
| EP | 1013948 | 6/2000 |
| GB | 1536862 | 12/1978 |
| WO | WO 0046520 | 8/2000 |

* cited by examiner

*Primary Examiner*—David A. Bucci
*Assistant Examiner*—Colby Hansen
(74) *Attorney, Agent, or Firm*—Diana D. Brehob

(57) ABSTRACT

A main bearing cap (20) for an internal combustion engine consists of an aluminum alloy with an iron alloy core (10). The cap has a supporting surface (22) for a bearing shell. The iron alloy core has a central portion (13) with two spaced apart through-channels (15) filled with an aluminum alloy (24) forming a coherent mass with an aluminum layer (23) the outer limiting surface of which forms the supporting surface (22).

9 Claims, 1 Drawing Sheet

MAIN BEARING CAP FOR INTERNAL COMBUSTION ENGINES

BACKGROUND OF INVENTION

1. Field of the Invention

The present invention relates to a bearing cap for a main bearing in an internal combustion engine. The cap consisting partially of an aluminum alloy and partially of an iron alloy forming a core in the aluminum material. The core has lateral portions with bores for mounting bolts and a central portion between the lateral portions. The central portion terminates at a distance from a supporting surface for a bearing shell, the supporting surface being the outer limiting surface of an aluminum alloy layer outside the iron core.

2. Background Information

It is known in the art to use main bearing caps made entirely of aluminum in aluminum engine blocks to provide a design which is as light as possible. The lowest possible weight can, however, only be achieved at the cost of increased mechanical engine noise due to the greater thermal expansion of the aluminum material causing in increased bearing clearance. It is also known to combine low weight with reduced noise by casting an iron core in the aluminum material, so that the thermal expansion resulting in increased bearing clearance is less than in a bearing cap made entirely of aluminum. In a previously known design of the type described above by way of introduction and disclosed in U.S. Pat. No. 5,203,854, the iron alloy core has a channel running through the middle of the central portion. This channel is filled with the aluminum alloy forming a coherent mass with the aluminum alloy to provide a mechanical grip between the core and the aluminum material. This channel weakens the core in its most loaded section, while the aluminum alloy in it, due to the higher thermal expansion of the aluminum alloy compared with the iron alloy, causes higher bearing distortion in the most loaded section.

SUMMARY OF INVENTION

The purpose of the present invention is to achieve a main bearing cap of the type described by way of introduction, which improves the strength of the central portion of the iron alloy core and reduces bearing distortion without reducing the mechanical grip between the core and the aluminum material.

This is achieved, according to the invention, by the iron alloy core having, in its central portion, at least two channels spaced from each other at either side of the center of the central portion, the channels being filled with an aluminum alloy forming a coherent mass with the aluminum layer.

By dividing the single centrally located channel of the previously known core described above into two channels displaced from the center section of the central portion of the core, the advantage is improved strength of the most loaded section. An additional advantage is reduced bearing distortion caused by thermal expansion of the aluminum due to displacing the channels from the most loaded section.

Yet another advantage is the reduction of the mass of the core compared with the previously known core described above while maintaining the strength. This is achieved by the two channels displaced from the center section of the central portion which allow the central section to be designed essentially U-shaped with a thickness decreasing from the center towards the side portions.

The above advantages and other advantages, objects, and features of the present invention will be readily apparent from the following detailed description of the preferred embodiments when taken in connection with the accompanying drawings.

DETAILED DESCRIPTION

Figure 1:
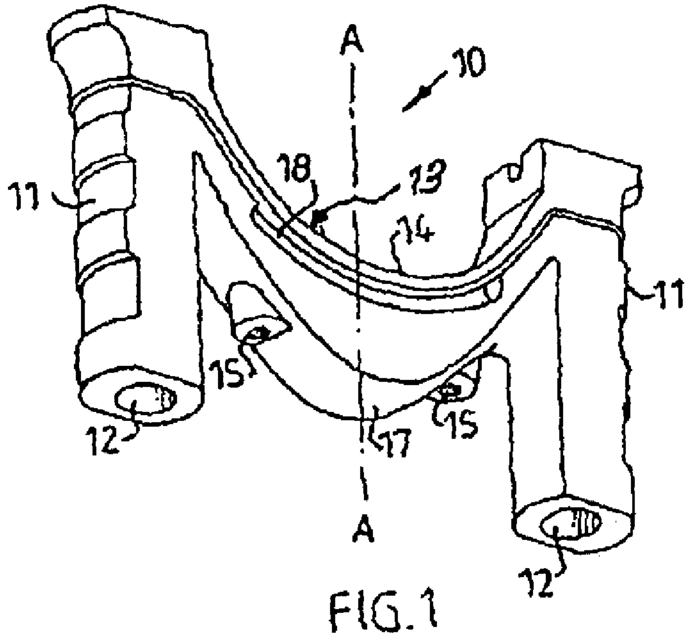
FIG. 1 is a perspective view of an embodiment of an iron alloy core according to the present invention for an aluminum alloy main bearing cap.

FIG. 1 shows an iron alloy core 10, according to the present invention. It has tubular lateral portions 11 with bores 12 for bolts. An essentially U-shaped central portion 13 between the lateral portions 11 has a semi-circular upper limiting surface 14. As can be seen, the central portion 13 has a maximum thickness in its center section A—A, the thickness decreasing gradually towards the lateral portions 11. Two through-channels 15, equally spaced from the center section A—A, extend from the upper surface 16 of the core 10 to the under side 17 of the core. Two pockets 18 are formed in opposite sides of the central portion 11 of the core 10 to increase the mechanical grip between the in-cast core and the surrounding aluminum alloy.

Figure 2:
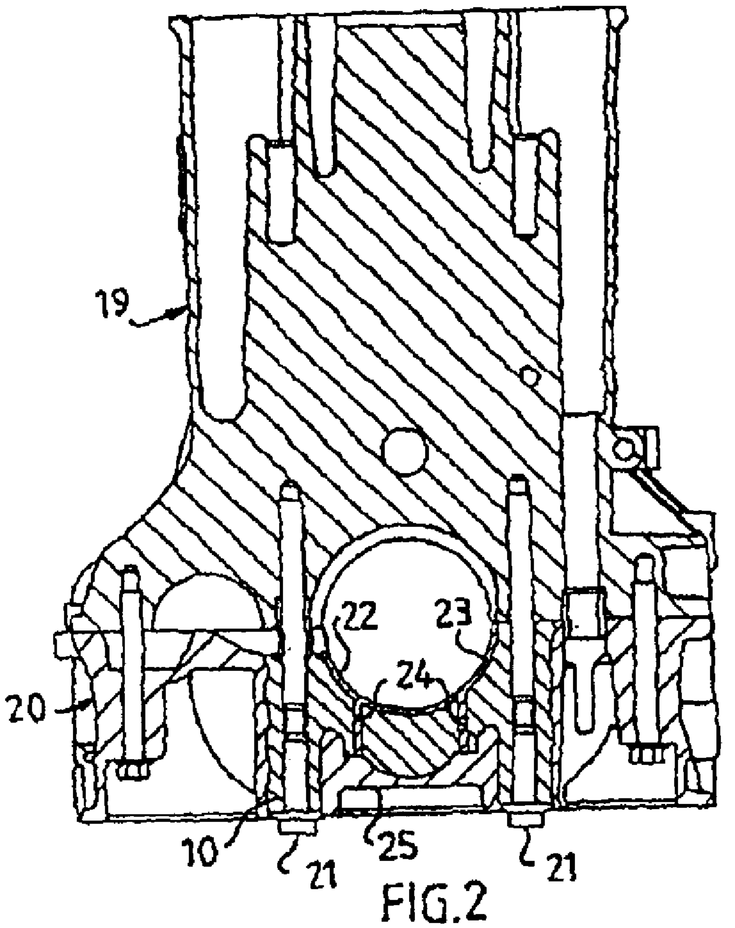
FIG. 2 is a cross-section of an engine block with a main bearing bridge incorporating main bearing caps with iron alloy cores shown in FIG. 1.

FIG. 2 shows an engine block 19 made of an aluminum alloy. A main bearing bridge 20 made of an aluminum alloy with in-cast iron alloy cores 10 is attached to the engine block by means of bolts 21 in the bores 12 in the lateral portions 3 of the core 10. The surface 22 of an approximately 3 mm thick aluminum layer 23 forms a support surface for a bearing shell (not shown). The channels 15 are filled with aluminum material 24 which forms a coherent mass with the aluminum layer 23 and with the aluminum material 25 below the central portion 13 and between the lateral portions 11 of the core 10.

The bearing cap, according to the present invention has been described above as being one of several bearing caps composing a main bearing bridge or bedplate, but it could just as well be a single regular main bearing cap.

While a mode for carrying out the invention has been described in detail, those familiar with the art to which this invention relates will recognize alternative designs and embodiments for practicing the Invention. The above-described embodiments are intended to be illustrative of the invention, but may be modified within the scope of the following claims.

I claim:

1. A bearing cap for a main bearing in an internal combustion engine, the cap being composed partially of an aluminum alloy and partially of an iron alloy forming a core in the aluminum material: the core having lateral portions with bores for mounting bolts and a central portion between the lateral portions, the central portion terminating at a distance from a supporting surface for a bearing shell, the supporting surface being the outer limiting surface of an aluminum alloy layer outside the iron core, wherein said iron alloy core having in its central portion at least two channels spaced from each other on each side of the center of the central portion, said channels being filled with an aluminum alloy forming a coherent mass with the aluminum layer.

2. The bearing cap of claim 1, wherein said central portion of the core is essentially U-shaped with a thickness decreasing from the center towards the lateral portions.

3. The bearing cap of claim 1, wherein opposite sides of said central portion of the core is provided with pockets to increase the mechanical grip between the core and the aluminum alloy.

4. The bearing cap of claim 1, wherein said aluminum alloy layer is a semi-circular layer of substantially uniform thickness outside the iron alloy core.

5. The bearing cap of claim 1, wherein the bearing cap is one of several bearing caps composing a main bearing bridge.

6. A main bearing bridge for an internal combustion engine, comprising:

a plurality of main bearing caps, each cap made partially of an aluminum alloy and partially of an iron alloy forming a core in the aluminum material said core having lateral portions with bores for mounting bolts and a central portion between said lateral portion, said central portion terminating at a distance from a supporting surface for a bearing shell, said supporting surface being the outer limiting surface of an aluminum alloy layer outside the core, said core having in its central portion at least two channels spaced from each other on each side of the center of said central portion, said channels being filled with an aluminum alloy forming a coherent mass with said aluminum layer.

7. The bearing bridge according to claim 6, wherein said central portion of said core is essentially U-shaped with a thickness decreasing from the center towards said lateral portions.

8. The bearing bridge according to claim 6, wherein opposite sides of said central portion of said core is provided with pockets to increase the mechanical grip between said core and said aluminum alloy.

9. The bearing bridge according to claim 6, wherein said aluminum alloy layer is a semi-circular layer of substantially uniform thickness outside said core.

* * * * *